United States Patent [19]

Kosaka et al.

[11] Patent Number: 5,614,001
[45] Date of Patent: Mar. 25, 1997

[54] HYDROGEN SEPARATOR, HYDROGEN SEPARATING APPARATUS AND METHOD FOR MANUFACTURING HYDROGEN SEPARATOR

[75] Inventors: Shinichi Kosaka; Osamu Sakai, both of Nagoya; Tomonori Takahashi, Chita; Takao Soma, Nishikamo-gun, all of Japan

[73] Assignee: NGK Insulators, Ltd., Nagoya, Japan

[21] Appl. No.: 445,027

[22] Filed: May 19, 1995

[30] Foreign Application Priority Data

May 23, 1994 [JP] Japan .................................. 6-108623
Jun. 22, 1994 [JP] Japan .................................. 6-140340

[51] Int. Cl.$^6$ .......................... B01D 53/22; B01D 71/02; B01D 71/04
[52] U.S. Cl. .................... 96/10; 96/11; 55/524; 55/DIG. 5; 95/55
[58] Field of Search ................. 95/55, 56; 96/4, 96/8, 10, 11; 55/524, DIG. 5

[56] References Cited

U.S. PATENT DOCUMENTS

| | | | |
|---|---|---|---|
| 2,773,561 | 12/1956 | Hunter | 95/56 |
| 3,245,206 | 4/1966 | Bonnet | 96/10 |
| 3,368,329 | 2/1968 | Eguchi et al. | 96/8 |
| 3,392,510 | 7/1968 | Koch, Jr. | 96/8 |
| 3,413,777 | 12/1968 | Langley et al. | 96/11 |
| 3,428,476 | 2/1969 | Langley et al. | 96/11 X |
| 3,437,357 | 4/1969 | Rubin | 96/8 X |
| 4,468,235 | 8/1984 | Hill | 95/56 X |
| 5,205,841 | 4/1993 | Vaiman | 95/56 X |
| 5,215,729 | 6/1993 | Buxbaum | 95/56 X |
| 5,358,553 | 10/1994 | Najjar et al. | 95/56 X |
| 5,376,167 | 12/1994 | Broutin et al. | 96/10 X |

FOREIGN PATENT DOCUMENTS

| | | | |
|---|---|---|---|
| 45-014404 | 5/1970 | Japan | 95/56 |
| 55-119420 | 9/1980 | Japan | 95/55 |
| 61-157323 | 7/1986 | Japan | 96/10 |
| 61-157324 | 7/1986 | Japan | 96/10 |
| 61-157327 | 7/1986 | Japan | 96/10 |
| 62-017001 | 1/1987 | Japan | 96/4 |
| 62-143801 | 6/1987 | Japan | 95/56 |
| 62-273030A | 11/1987 | Japan . | |
| 63-295402A | 12/1988 | Japan . | |
| 64-4216A | 1/1989 | Japan . | |
| 1-164419A | 6/1989 | Japan . | |
| 3-026322 | 2/1991 | Japan | 96/10 |
| 3-052630 | 3/1991 | Japan | 96/4 |

OTHER PUBLICATIONS

Shigeyuki Uemiya et al., "Hydrogen permeable palladium--silver alloy membrane supported on porous ceramics", Journal of Membrane Science, 56, (1991) 315–325.

Primary Examiner—Robert Spitzer
Attorney, Agent, or Firm—Ronald J. Kubovcik

[57] ABSTRACT

A hydrogen separator has a porous substrate having a through-hole, and a metal having a hydrogen separating ability coated on the inner surface of the through-hole of the porous substrate to close pores on the inner surface of the through-hole. A method for manufacturing a hydrogen separator by a chemical plating process, includes providing a porous substrate having a through-hole, and forcedly circulating a plating solution containing a metal having a hydrogen separating ability through the through-hole of the substrate. The inner surface of the through-hole is covered with the metal film having the hydrogen separating ability.

12 Claims, 4 Drawing Sheets

HYDROGEN SEPARATOR, HYDROGEN SEPARATING APPARATUS AND METHOD FOR MANUFACTURING HYDROGEN SEPARATOR

BACKGROUND OF THE INVENTION (i) Field of the Invention

The present invention relates to a hydrogen separator for separating a hydrogen gas only from a mixed gas containing hydrogen, a hydrogen separating apparatus using this hydrogen separator, and a method for manufacturing the hydrogen separator.

(ii) Description of the Related Art

A hydrogen gas has been used in large quantities as a fundamental material gas in a petroleum chemistry, and much expectation is put on the hydrogen gas as a clean energy source. The high-purity hydrogen gas can be obtained by converting a natural gas, a naphtha or the like as a material into a gas containing hydrogen by virtue of a catalyst, and then separating the hydrogen gas from the hydrogen-containing gas.

The hydrogen gas can be separated by utilizing the characteristics of the hydrogen gas that the hydrogen gas can be dissolved in palladium or an alloy containing palladium. Since the hydrogen gas alone can be dissolved in these metals, the hydrogen gas can be selectively separated.

In the case that palladium or the alloy containing palladium is used as a hydrogen separator, it is usually formed into a thin film. However, when the palladium thin film is singly used, its mechanical strength is poor, and thus in Japanese Patent Application Laid-open No. 273030/1987, a porous substrate of a porous ceramic or the like is coated with the palladium thin film to increase the mechanical strength.

In general, a hydrogen permeation velocity in the palladium film or the palladium alloy film can be represented by the formula (1)

$$Q = S/t(P_1^{1/2} - P_2^{1/2})K \quad (1)$$

wherein

Q is a hydrogen gas permeation velocity (Ncm$^3$/min),

S is a film area (cm$^2$), t is a film thickness (cm), $P_1$ is a partial pressure of a hydrogen gas in a material gas (kg/cm$^2$abs), $P_2$ is a partial pressure of a hydrogen gas in a permeated gas (kg/cm$^2$abs), and K is a hydrogen gas permeation velocity constant [Ncm$^3$/min·(kg/cm$^2$)$^{1/2}$].

As understood from the above-mentioned relation, in order to increase the permeation velocity of the hydrogen gas, it is necessary to increase a difference between the hydrogen gas partial pressure in the material gas and the hydrogen gas partial pressure in the permeated gas. Therefore, when a reformed gas containing methane, carbon dioxide and the like is used as the material gas, the material gas pressure is set to a high pressure of from several kg/cm$^2$abs to about 10 kg/cm$^2$abs, and the permeated gas pressure is set to a pressure of from negative pressure to several kg/cm$^2$abs.

As a technique of coating the porous substrate with the palladium thin film, there has been known a chemical plating method. For example, Japanese Patent Application Laid-open No. 4216/1989 has disclosed a technique which comprises subjecting a substrate of a porous ceramic to electroless palladium plating, and then forming a plating layer of electrolytic palladium or a palladium-containing alloy thereon.

Furthermore, in Japanese Patent Application Laid-open No. 164419/1989, it has been disclosed that a palladium thin film is formed on the surface of a heat-resistant porous substrate and a silver thin film is further formed on the palladium thin film by the chemical plating method, respectively, followed by a heat treatment, to allow silver and palladium to interdiffuse, thereby forming a hydrogen separating film comprised of an alloy of silver and palladium.

In the conventional hydrogen separators, however, the shape of the porous substrates is tubular or planar, and so it is difficult to increase the area of the hydrogen separating films in a certain volume so as to heighten a hydrogen separation efficiency (a volume efficiency) per unit volume.

For example, if it is intended to increase the volume efficiency by the use of the tubular hydrogen separators, the respective tubular hydrogen separators must be thinned so that the most possible hydrogen separators may be received in a certain volume. However, if the tubular hydrogen separators are thinned, the strength of these separators unavoidably deteriorates. In addition, it is difficult to manufacture a plurality of the tubes having the same size with a good accuracy, and even the slight unevenness of the size of the tubes makes the integration of these tubes difficult sometimes.

Moreover, in the conventional hydrogen separators, the hydrogen separating films are often formed on the outer surfaces of the porous substrates. However, most of the porous substrates are lower in thermal expansion coefficient as compared with palladium or an alloy containing palladium, and for this reason, when the porous substrates are used at a high temperature, the hydrogen separating films with which the outer surfaces of the tubular porous substrates are coated tend to peel and crack, so that the material gas might leak into a purified gas.

When the hydrogen separators are attached to flanges or the like to construct the hydrogen separating apparatus, or when this apparatus is used, vibration occurs, so that mechanical shock or friction is applied to the outer surfaces of the hydrogen separators to damage the hydrogen separating films on occasion.

In the case that a difference of temperature distribution occurs in the hydrogen separating apparatus in which a plurality of the tubular hydrogen separators are used, the conduction of heat is not carried out between the hydrogen separators, so that thermal expansion increases in part of the hydrogen separators, with the result that high stress is generated at the bonding positions of the hydrogen separators and the flanges. In consequence, airtightness at the bonding positions is inconveniently impaired.

SUMMARY OF THE INVENTION

Objects of the present invention are to provide a hydrogen separator and a method for manufacturing the hydrogen separator, capable of solving the above-mentioned problems.

Other object of the present invention is to provide a hydrogen separating apparatus utilizing the above hydrogen separator.

In order to achieve the above objects, the present inventors have intensively investigated, and as a result, it has been found that the above-mentioned problems can be solved by the use of a porous substrate having through-holes. In consequence, the present invention has been completed.

That is to say, according to one aspect of the present invention, there can be provided a hydrogen separator comprising, a porous substrate having a through-hole, and a metal having a hydrogen separating ability, said metal coating on the inner surface of the through hole of the porous substrate to close pores on the inner surface of the through-hole.

In the hydrogen separator of the present invention, it is preferable that the substrate has a plurality of the through-holes, and the metal having the hydrogen separating ability is preferably palladium or an alloy containing palladium.

Furthermore, the diameter of the pores on the inner surface of the through-hole is preferably in the range of 0.005 to 5 µm.

According to another aspect of the present invention, there can be provided a method for manufacturing a hydrogen separator by a chemical plating process, comprising providing a porous substrate having a through-hole, and forcedly circulating a plating solution containing a metal having a hydrogen separating ability through the through-hole of the substrate, whereby the inner surface of the through-hole may be covered with the metal film having the hydrogen separating ability.

In order to forcedly circulating the plating solution containing the metal having the hydrogen separating ability through the through-hole of the substrate, a pump is preferably used, and it is also preferable that the direction of the circulation can be switched.

According to still another aspect of the present invention, there can be provided a hydrogen separating apparatus comprising, a container having an inlet for feeding a material gas, a first outlet for discharging a hydrogen gas component, and a second outlet for discharging an unpermeated gas, and a hydrogen separator supported in an overhung state in the container, the hydrogen separator comprising a porous substrate having a through-hole, and a metal having a hydrogen separating ability, said metal coating on the inner surface of the through-hole of the porous substrate to close pores on the inner surface of the through-hole, wherein the hydrogen gas component in the material gas fed through the inlet is allowed to permeate through the metal having a hydrogen separating ability and then discharged through the first outlet and the unpermeated gas is discharged through the second outlet.

In the hydrogen separating apparatus, the hydrogen separator preferably has a plurality of the through-holes arranged in parallel and is suitably equipped with a cushion means for absorbing the expansion of the hydrogen separator.

DETAILED DESCRIPTION OF THE INVENTION

Figure 1:
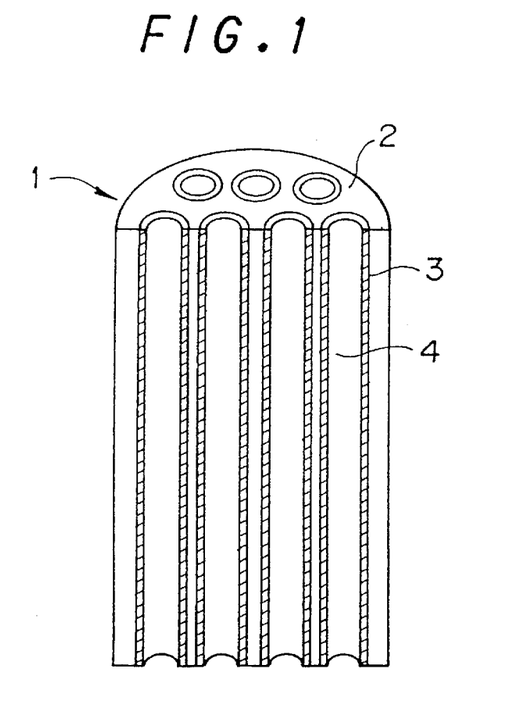
FIG. 1 is a perspective view of a hydrogen separator of the present invention which is partially cut off.

Next, the constitution of a hydrogen separator of the present invention will be described with reference to FIG. 1.

A hydrogen separator 1 is constituted of a porous substrate 2 and hydrogen separating films 3 which cover the inner surfaces of through-holes 4.

The porous substrate 2 preferably has a cylindrical structure having a plurality of the through-holes 4. However, the shape of the porous substrate 2 is not limited to the cylindrical shape, and for example, a prismatic shape is also acceptable. In addition, the cylindrical or the prismatic structure may be curved along its axis. The shape of the through-holes is usually a straight-line shape, but this is not restrictive. For example, the curved through-holes are also acceptable.

The porous substrate 2 has many pores therein and on its surface, and these pores are connected to one another in a three-dimensional state, whereby a gas can pass the porous substrate 2 through these pores therein. The hydrogen separating films 3 cover inner surfaces of the through-holes 4 so as to fill and close the pores opened on the inner surfaces.

The hydrogen separating films 3 comprise a metal having a hydrogen separating ability. As such a metal, palladium or an alloy containing palladium can be suitably used.

When the material gas passes through the hydrogen separating films 3, gas separation is carried out, and at this time, the material gas is prevented from leaking into the side of a purified gas, because the hydrogen separating films 3 cover the inner surfaces of the through-holes 4 so as to fill and close the pores opened on the inner surfaces of the through-holes 4. Therefore, for example, in the case of the hydrogen separator of the present invention in which the palladium alloy is used as the hydrogen separating films, a hydrogen gas having a purity of 99% or more can be obtained, and in general, the hydrogen gas having a purity of 99.9% or more can be obtained.

For the porous substrate 2, there is required a material which reacts with neither the material gas nor the metal having the hydrogen separating ability and which withstands high temperature and high pressure and which has excellent heat resistance and mechanical strength. Typical examples of the preferable material for the porous substrate 2 include alumina, silica, silica-alumina, mullite, cordierite, zirconia, carbon, porous glass, and a metal such as a stainless filter subjected to a surface treatment.

Of the pores of the porous substrate 2, the pores present on the inner surfaces of the through-holes 4 are controlled to preferably have a diameter of 0.005 to 5 µm, more preferably 0.01 to 1 µm.

If the pore diameter is less than 0.005 µm, resistance to the passage of the gas increases inconveniently. On the other hand, if it is more than 5 µm, much time is unpreferably taken to cover the inner surfaces of the through-holes 4 with the metal having the hydrogen separating ability, and pinholes tend to occur through the hydrogen separating films 3. Such a porous substrate can be obtained by a method described in Japanese Patent Application Laid-open No. 273030/1987.

The pores in the porous substrate 2 preferably have a small unevenness, because the uniformization of the pore diameters permits the easy adjustment of the permeation depth of a plating solution into the porous substrate 2 in an activation step or a chemical plating step.

The thickness of the hydrogen separating films 3 is preferably 50 μm or less, more preferably 20 μm or less. If the thickness of the hydrogen separating films 3 is more than 50 μm, much time is taken for the material gas to diffuse in the hydrogen separating films 3, so that a treatment time is unpreferably prolonged.

The permeation depth of the metal having the hydrogen separating ability into the porous substrate 2 is preferably in the range of 1 to 30 μm from its surface, more preferably 1 to 20 μm, most preferably 1 to 10 μm. If the permeation depth of the metal is less than 1 μm, the closure of the pores with the metal having the hydrogen separating ability is not sufficient, so that the material gas might leak into the side of the purified gas; and the hydrogen separating films 3 are also liable to separate from the inner surfaces of the through-holes 4. On the other hand, if this depth is larger than 30 μm, the diffusion time of the material gas is inconveniently prolonged at the time of the hydrogen separation.

When the palladium alloy is used as the metal having the hydrogen separating ability, the content of metals other than palladium is preferably in the range of 10 to 30% by weight, as described in "Hydrogen Permeable Palladium—Silver Alloy Membrane Supported on Porous Ceramics", Journal of Membrane Science, 56, p. 315–325 (1991) and Japanese Patent Application Laid-open No. 295402/1988. The main purposes of using the palladium alloy are to prevent the brittleness of palladium by hydrogen and to improve a separation efficiency at a high temperature. The addition of silver to palladium is particularly preferable to prevent the brittleness of palladium by hydrogen.

Next, a method for manufacturing the hydrogen separator of the present invention will be described.

The manufacturing method can be divided into an activation step or a chemical plating step.

In the activation step, an activated metal is adsorbed on the inner surfaces of the through-holes 4 of the substrate and the inside surfaces of the pores present on the inner surfaces. Concretely, the porous substrate is alternately immersed in an aqueous tin chloride solution in hydrochloric acid and an aqueous palladium chloride solution in hydrochloric acid, thereby obtaining suitable results.

Figure 2:
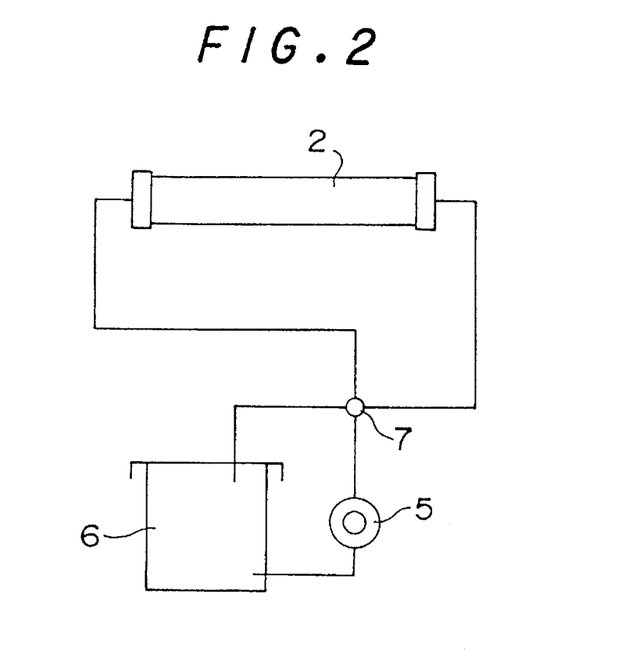
FIG. 2 is an illustrative view showing one embodiment of a technique of covering the inner surfaces of the through-holes of a porous substrate with a metal.

In the chemical plating step, the interiors of the pores are closed and covered with a plating solution containing at least the metal for covering the substrate and a reducing agent. In order to inhibit the occurrence of pinholes and to control the thickness of the hydrogen separating films, a plating solution 6 is forcedly fed to and circulated through the through-holes 4 of the substrate 2 by means of a pump 5 or the like, as shown in FIG. 2. In this case, the circulation direction of the plating solution can suitably be switched to achieve the uniformization of the film thickness, and a treatment time can be adjusted to control the film thickness. For the switch of the circulation direction, a four way cock 7 or the like ban be suitably used. In the case that a palladium-silver alloy is used as the metal having the hydrogen separating ability, this alloy is preferably formed as follows. First, palladium is subjected to a chemical plating treatment, and the surface of palladium is then chemically plated with silver. In the last place, palladium and silver are allowed to interdiffuse to form the alloy.

The above-mentioned hydrogen separator can be used in the hydrogen separating apparatus so that the material gas may be introduced from the outside of the hydrogen separator or introduced through the through-holes. In either case, the hydrogen separator is supported by flanges in a container having an inlet for the material gas, an outlet for the hydrogen gas which has permeated through the hydrogen separating films, and another outlet for the gas which has not permeated through the hydrogen separating films.

In the case that the material gas is introduced from the outside of the hydrogen separator, the hydrogen separator is supported at its one end alone in an overhung state in the container, whereby a difference of thermal expansion between the container and the hydrogen separator can be absorbed. Furthermore, in the case that the material gas is introduced through the through-holes, the material gas is introduced from part of ends of the through-holes, and the gas which has not permeated through the hydrogen separating films can be discharged from part of the other ends of the through-holes.

In the case that the material gas is introduced through the through-holes, and when the material is introduced from the ends of the through-holes and the unpermeated gas is discharged from the other ends, the hydrogen separator is supported at its end in the container, and both the ends of the through-holes are required to coincide with the outlet or the inlet of the container. In such a case, the hydrogen separator might be damaged by the difference of the thermal expansion between the hydrogen separator and the container, and a structure for connecting the through-holes and the outlet or the inlet of the container might be damaged. In order to prevent such troubles, a cushion means for absorbing the expansion of the hydrogen separator is necessary. Such a means is the installation of a bellowslike thermal expansion absorbing portion to the container in view of a fact that the pressure in the through-holes which are on the side of the material gas increases and the pressure on the inside surface of the container which is on the side of the permeated gas decreases. Another means is the utilization of elastic spiral tubes for connecting the through-holes to the outlet or the inlet of the container.

In both the case that the material gas is introduced from the outside of the hydrogen separator and the case that the material gas is introduced through the through-holes, the hydrogen separator is fixed to the container by the flanges, which means that the hydrogen separator is supported in an overhung state.

According to the present invention, the compact hydrogen separator having an improved volume efficiency can be provided as described above, and therefore this hydrogen separator can be combined with a fuel battery and used as a portable power source or a power source for an electromobile. Now, there has been investigated a system comprising a fuel battery and a hydrogen producing apparatus which can produce hydrogen by reforming, with water vapor, methane of a town gas, a liquid hydrocarbon such as methanol or ethanol and/or a hydrocarbon containing an oxygen atom as a fuel. However, the reformed gas contains about 1% of CO, and this CO poisons Pt which is an electrode catalyst for a phosphate type or a solid polymeric type fuel battery. Particularly in the case of the solid polymeric type fuel battery, even if the concentration of CO is about 10 ppm, Pt is poisoned with CO. Therefore, it is necessary to lower the CO concentration to several ppm or less, and hence, the combination of a reformer and the hydrogen separator of the present invention is desirable. When the hydrogen separator of the present invention is applied to a car, methanol or ethanol is preferable as the fuel, because this kind of fuel is suitable for storage and transport. Moreover, as the fuel battery, there can be used the phosphate type and the solid polymeric type fuel battery, but the solid polymeric type fuel battery is more preferable, because its operation temperature is as low as 100° C. or less and it is small-sized and lightweight.

Next, the present invention will be described in more detail with reference to embodiments on the basis of attached drawings, but the scope of the present invention should not be limited to these embodiments.

Figure 3:
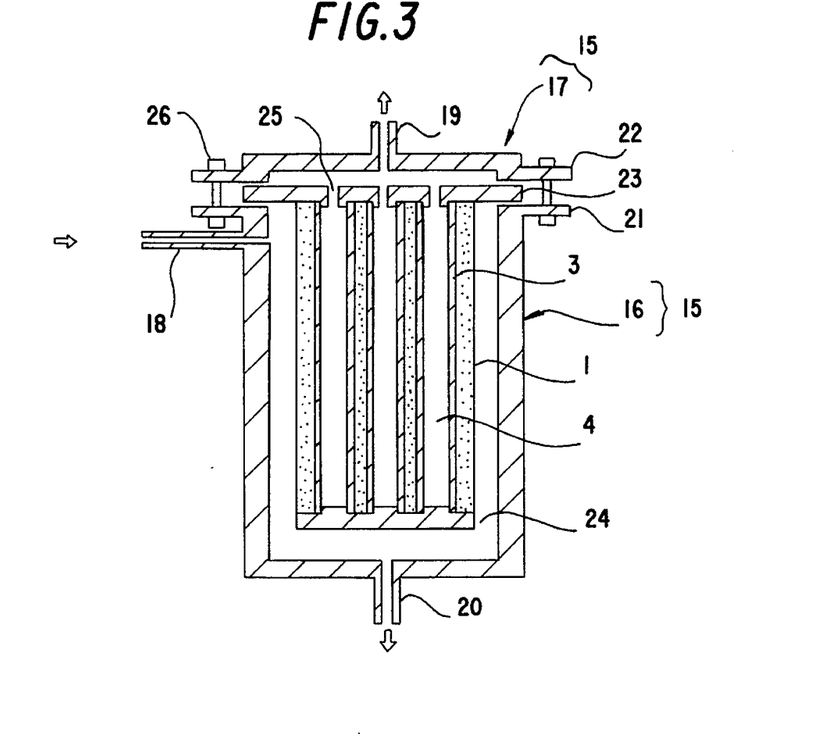
FIG. 3 is an illustrative view showing one embodiment of the hydrogen separator of the present invention.

FIG. 3 shows one embodiment of a hydrogen separating apparatus using a hydrogen separator of the present invention. In FIG. 3, a container 15 is constituted of a container body 16 and a lid 17, and it has an inlet 18 for a material gas, an outlet 19 for a separated hydrogen gas and another outlet 20 for an unpermeated gas.

The container body 16 is cylindrical and has a bottom, an upper opening, the inlet 18 for the material gas on its outer periphery, and the outlet 20 for the unpermeated gas. In addition, the container body 16 has an outward lug 21 around the outer peripheral edge of the opening.

On the other hand, the lid 17 has a lower opening, the outlet 19 for the separated hydrogen gas at its central position, and an outward lug 22 around the outer peripheral edge of the opening.

Flanges 23, 24 are made of a ceramic or a metal and have a disc shape, and it is further equipped with a plurality of circular projections having the same diameter as that of the through-holes 4 of the hydrogen separator 1. The flange 23 has orifices 25 at the centers of the above-mentioned projections. The flanges 23, 24 are stuck and fixed to ends of the hydrogen separator 1, with the projections being inserted into the through-holes 4 of the porous substrate 1.

The outer peripheral edge of the flange 23 is airtightly nipped by a gasket or the like and the lugs 21, 22 of the lid 17 and the container body 16, and the peripheral edge is further fastened and fixed by fixing members 26.

In this way, one end of the hydrogen separator 1 is fixed in an overhung state to the container 15 via the flange 23. One end of each of the through-holes 4 is connected to the outlet 19 for the separated hydrogen gas via the orifices 25 of the flange 23, and the other ends of the through-holes 4 are airtightly sealed by the flange 24.

The material gas is fed to the hydrogen separating apparatus through the inlet 18 for the material gas, and the hydrogen gas selectively permeates through the hydrogen separating films 3 formed on the inner surfaces of the through-holes 4, flows into the through-holes 4, passes through the interior of the lid 17, and then discharges through the outlet 19.

Figure 4:
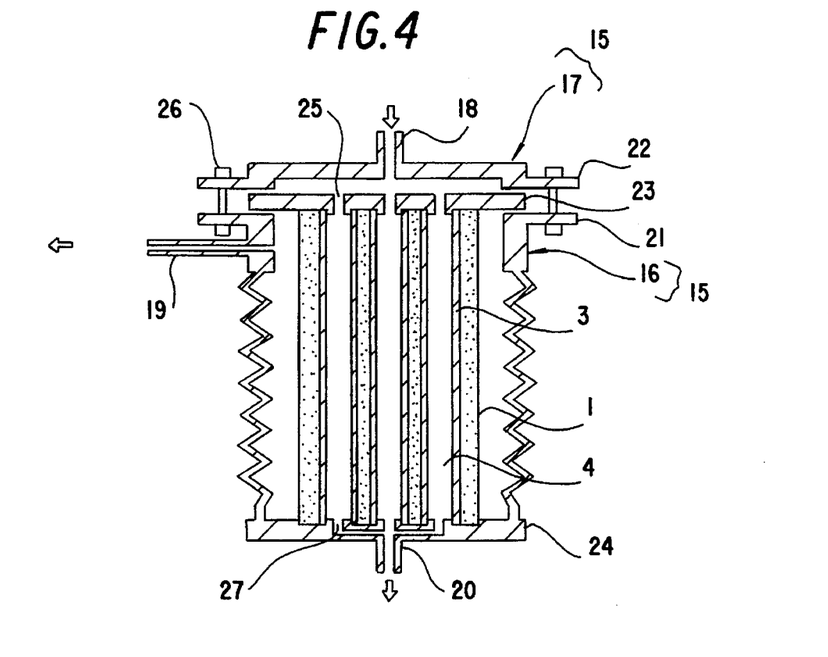
FIG. 4 is an illustrative view showing another embodiment of the hydrogen separator of the present invention.
Figure 5:
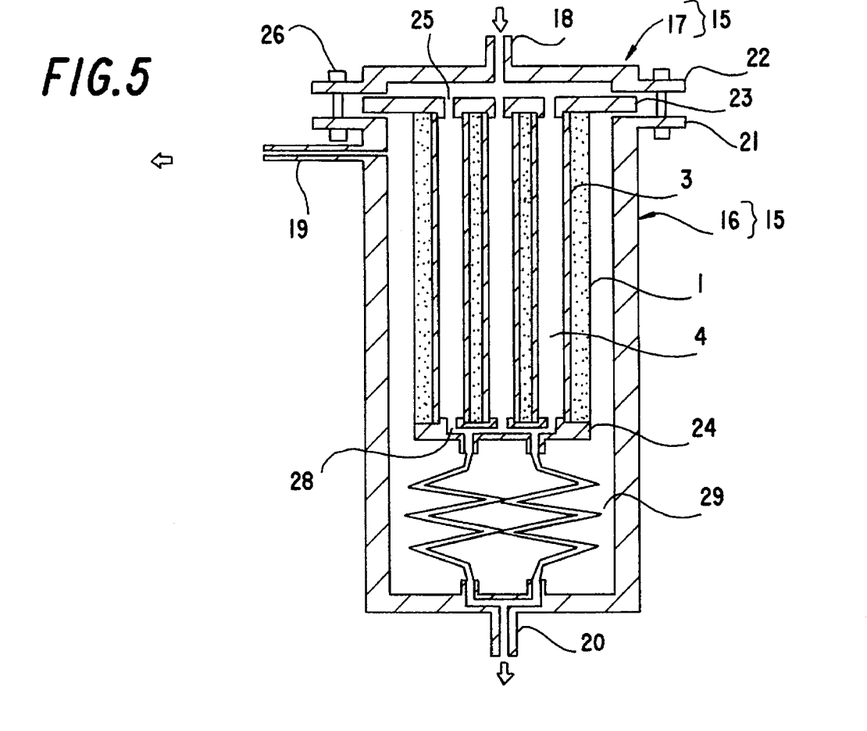
FIG. 5 is an illustrative view showing still another embodiment of the hydrogen separator of the present invention.
Figure 6:
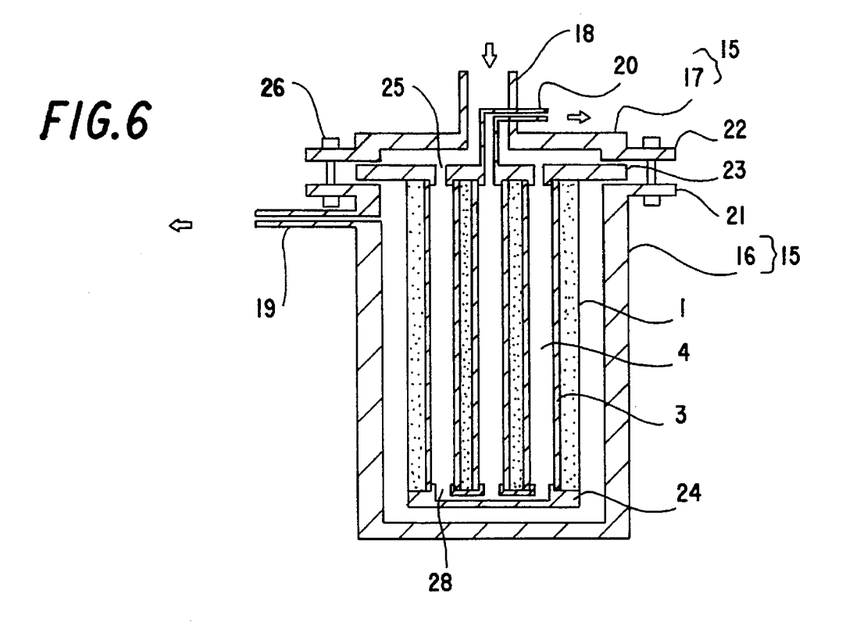
FIG. 6 is an illustrative view showing a further embodiment of the hydrogen separator of the present invention.

Other embodiments of the hydrogen separating apparatuses using the hydrogen separator of the present invention are shown in FIGS. 4, 5 and 6.

In the hydrogen separating apparatus shown in FIG. 4, the hydrogen separator 1 is supported in an overhung state by the flange 23 in the container 15. In this case, the material gas introduced through the inlet 18 gets into the through-holes 4 from the ends of the through-holes 4 through the orifices 25 of the flange 23. The hydrogen gas selectively permeates through the hydrogen separating films 3, flows out of the hydrogen separator 1, and then discharge through the outlet 19. On the other hand, the unpermeated gas is discharged through the other ends of the through-holes 4 and then the outlet 20.

Therefore, the bottom of the container 16 is equipped with a plurality of circular projections having the same diameter as that of the through-holes 4 of the hydrogen separator 1 and having orifices 27 at their centers, and the container bottom is further stuck and fixed to the end of the hydrogen separator 1, with the projections being inserted into the through-holes 4 of the hydrogen separator 1. The orifices 27 formed at the centers of the circular projections are connected to the outlet 20.

In order to prevent the hydrogen separating apparatus from being damaged by a difference of thermal expansion between the container 15 and the hydrogen separator 1, the outer surface of the container body 16 is constituted in a bellowslike state, whereby the extension of the hydrogen separator 1 in its axial direction can be tolerated. The bellowslike portion suffers the pressure of the permeated gas, but this pressure is low, usually in the range of from negative pressure to several kg/cm$^2$, and therefore the force which functions to extend the bellows can be ignored.

A hydrogen separating apparatus shown in FIG. 5 is a type in which the material gas is fed to the through-holes 4 as shown in FIG. 4, but the end of the hydrogen separator 1 which is not fixed by the flange 23 is stuck and fixed by the flange 24 having orifices 28. These orifices 28 of the flange 24 are connected to the outlet 20 for the unpermeated gas via pipes 29. These pipes 29 are spirally constituted to possess elasticity, and so by the use of the pipes 29, the extension of the hydrogen separator 1 in the axial direction can be absorbed, whereby the hydrogen separating apparatus is prevented from being damaged by the difference of the thermal expansion between the container 15 and the hydrogen separator 1.

A hydrogen separating apparatus shown in FIG. 6 is also a type in which the material gas is fed to the through-holes 4 as shown in FIGS. 4 and 5, and the hydrogen separator 1 is supported in the overhung state in the container 15. The above-mentioned hydrogen separating apparatuses shown in FIGS. 4 and 5 have the structure in which the material gas is introduced from one end of the hydrogen separator and the unpermeated gas is discharged from the other end thereof, but in a hydrogen separating apparatus shown in FIG. 6, the material gas is introduced and the unpermeated gas is discharged from one end of the hydrogen separator.

In the hydrogen separating apparatus shown in FIG. 6, part of the orifices 25 which are opened on the side of the inlet 18 of the through-holes 4 are connected to the inlet 18, and the other orifice is connected to the outlet 20 for the unpermeated gas. Therefore, the outlet 20 and the inlet 18 form a double tube structure. The flange 24 has the orifices 28, and the end of the hydrogen separator 1 is closed, the through-holes being connected to each other.

The material gas introduced from the inlet 18 passes through the orifices 25 of the flange 24, and then discharges through the outlet 20. The hydrogen gas component in the material gas permeates through the hydrogen separating films 3, and then discharges through the outlet 19.

Therefore, it is not necessary to link both the ends of the hydrogen separator 1 to the container 15, and thus such a cushion means as absorbs the difference of the thermal expansion between the container 15 and the hydrogen separator 1 is not required any more.

Of the through-holes 4, the through-holes present in the vicinity of the outer surface of the hydrogen separator 1 are preferably connected to the inlet 18 for the material gas, and the through-holes present inside the hydrogen separator 1 are preferably connected to the outlet 20 for the unpermeated gas.

In these hydrogen separating apparatuses, the unpermeated gas discharged through the outlet 20 can be returned to the inlet 18 and then subjected to the separation treatment again. In addition, these hydrogen separating apparatuses may be combined in a multi-stage state.

The material for the flanges 23, 24 is required to have no breathability, and examples of the usable material include dense ceramics made of alumina, silica, silica-alumina, mullite, cordierite, zirconia and the like, and metals such as SUS, Inconel and Kovar, and it is desirable to use the material having a thermal expansion coefficient similar to that of the porous substrate.

For a bond between the flanges 23, 24 and the hydrogen separator 1, a heat-resistant inorganic bonding agent can be used, and examples of the suitably usable bonding agent include a cement, a mortar and the like having a thermal expansion coefficient similar to that of the flanges 23, 24, and a glass and a brazing material having a transition point of 550° C. or more.

Next, the present invention will be described in detail with reference to examples.

EXAMPLE 1

A hydrogen separator was prepared as follows.

In the first place, a porous substrate was subjected to an activation treatment. The porous substrate which was used herein was a cylindrical α-alumina porous material having an outer diameter of 30 mm, a length of 300 mm, a pore diameter of 0.2 μm and 37 through-holes of 3 mm in diameter.

The surfaces of the porous substrate except the inner surfaces of the through-holes, i.e., the outer periphery of the cylindrical porous substrate and the end surfaces of the substrate except the portions of the through-holes were covered with a sealing tape, and the substrate was then immersed in a 0.1% aqueous hydrochloric acid solution containing 0.1% by weight of $SnCl_2.H_2O$ for 1 minute, and further immersed in a 0.1% aqueous hydrochloric acid solution containing 0.01% by weight of $PdCl_2$ for 1 minute. These immersion treatments were alternately repeated 10 times, respectively, to activate the inner surfaces of the through-holes. In this case, the substrate was sufficiently washed with pure water after each treatment.

Next, the substrate was plated with palladium by chemical plating. That is to say, a plating solution containing 5.4 g of $[Pd(NH_3)_4]Cl_2.H_2O$, 67.2 g of 2Na.EDTA, 651.3 ml of aqueous ammonia having an ammonia concentration of 28% and 0.46 ml of $H_2NNH_2.H_2O$ per liter of deionized water was prepared. This plating solution was placed in a plating solution tank, and then fed to the inner surfaces of the through-holes of the porous substrate by means of a circulating pump. Furthermore, the circulating direction of the plating solution was switched after a certain time by a four way cock to achieve the uniformization of a film thickness, and a treatment time was adjusted to control the film thickness.

Next, the substrate was further plated with silver by chemical plating. That is to say, a plating solution containing 3.46 g of $AgNO_3$, 33.6 g of 2Na.EDTA, 651.3 ml of aqueous ammonia having an ammonia concentration of 28% and 0.46 ml of $H_2NNH_2.H_2O$ per liter of deionized water was prepared. As in the case of palladium, this plating solution was fed to the inner surfaces of the through-holes of the porous substrate by means of the circulating pump. Furthermore, the circulating direction of the plating solution was switched after a certain time by the four way cock to achieve the uniformization of a film thickness, and a treatment time was adjusted to control the film thickness. The treatment time was changed so that a weight ratio of palladium:silver might be 80:20, thereby forming plating films having a film thickness of 20 μm.

Afterward, the thus plated substrate was held at 900° C. for 12 hours under an argon atmosphere to carry out a heat treatment, whereby palladium and silver were allowed to interdiffuse to form an alloy.

The porous substrate was cut along its axial direction into a length of 3 cm, and the whole porous substrate was then sealed with glass except the portions of the through-holes on both the ends thereof. Afterward, alumina dense tubes were attached to both the ends of the porous substrate to obtain a hydrogen separator.

Figure 7:
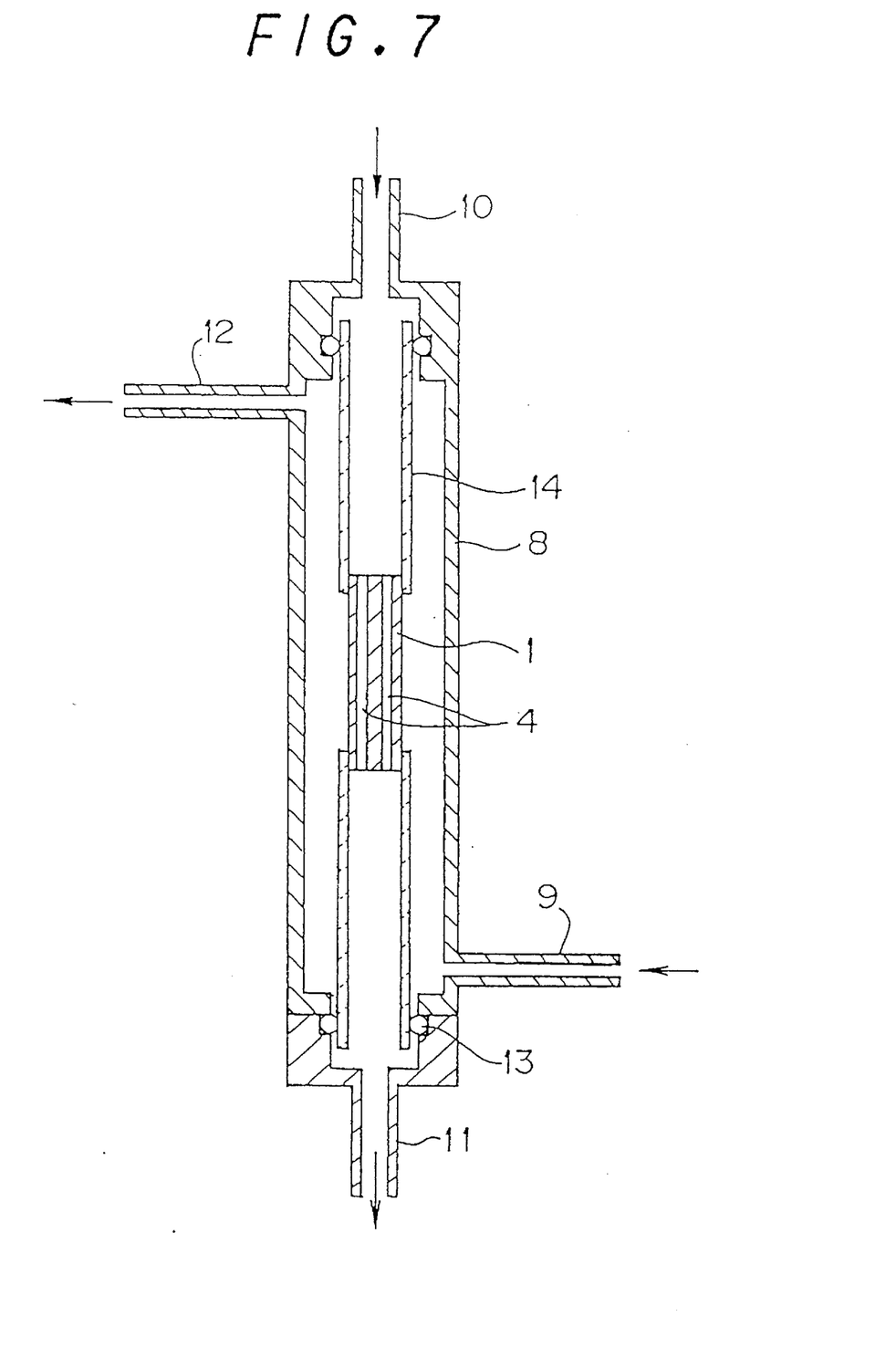
FIG. 7 is an illustrative view of a gas purification process using the hydrogen separator of the present invention.

For the thus obtained hydrogen separator, a hydrogen separation test was carried out. A mixed gas comprising 80% by volume of hydrogen and 20% by volume of carbon dioxide was used as a material gas. FIG. 7 shows the schematic view of a test device. A chamber 8 was equipped with the hydrogen separator 1 connected to alumina dense tubes 14 and sealed with O-rings 13. In the first place, chamber 8 was heated up to 500° C. Next, the mixed gas having a pressure of 9 kg/cm² was introduced into a space around the hydrogen separator 1 through an inlet tube 9 at 2N liters/minute (i.e., the volume at room temperature was 2 liters). Furthermore, an argon gas having a pressure of 1 kg/cm² was fed as a carrier gas to the inner surfaces of the through-holes 4 of the hydrogen separator 1 through an inlet tube 10 at 0.1N liter/minute. For a purified gas obtained through an outlet tube 11, quantitative analysis was carried out to inspect a gas permeation rate of the purified gas and a hydrogen concentration in the purified gas.

The results are shown in Table 1.

EXAMPLE 2

A cylindrical α-alumina porous material having an outer diameter of 30 mm, a length of 300 mm, a pore diameter of 0.2 μm and 19 through-holes of 4 mm in diameter was used, and the same procedure as in Example 1 was then carried out to prepare a hydrogen separator.

A hydrogen separation test was carried out by the same procedure as in Example 1 to inspect a gas permeation rate of the purified gas and a hydrogen concentration in the purified gas. The results are shown in Table 1.

EXAMPLE 3

In a test device in a schematic view of FIG. 7, a mixed gas was introduced through an inlet tube 10, and a carrier gas was introduced through an inlet tube 9 to carry out gas purification. Next, inspection was made for a gas permeation rate of the purified gas obtained through an outlet tube 12 and a hydrogen concentration in the purified gas.

The test device which was used herein was the same as in Examples 1 and 2, and the kinds of gases, the introduction conditions of the gases and the like were also the same as in Example 1 or 2.

Comparative Example

A cylindrical α-alumina porous material having an outer diameter of 10 mm, an inner diameter of 7 mm, a length of 300 mm and a pore diameter of 0.2 μm was used as a porous substrate to prepare a hydrogen separator.

The substrate was immersed in a 0.1% aqueous hydrochloric acid solution containing 0.1% by weight of $SnCl_2.H_2O$ for 1 minute, and further immersed in a 0.1% aqueous hydrochloric acid solution containing 0.01% by weight of $PdCl_2$ for 1 minute. These immersion treatments were alternately repeated 10 times, respectively, to activate the outer surface of the substrate. In this case, the substrate was sufficiently washed with pure water after each treatment.

The chemical plating of palladium and silver was carried out by immersing the substrate in the same plating solution as in Example 1 which was controlled to a temperature of 50° C. In this case, adjustment was made so that a weight ratio of palladium:silver might be 80:20, thereby forming plating films having a film thickness of 20 µm.

A hydrogen separation test was carried out by the same procedure as in Example 1 to inspect a gas permeation rate of a purified gas and a hydrogen concentration in the purified gas. The results are shown in Table 1.

TABLE 1

|  | Example 1 | Example 2 | Comp. Example |
| --- | --- | --- | --- |
| Shape of Porous Substrate | Cylindrical | Cylindrical | Tubular |
| Number of through-holes | 37 | 19 | — |
| Film Thickness (µm) | 20 | 20 | 20 |
| Purified Gas in Hydrogen Separation Test ($ml/cm^2/min$) | 41 | 40 | 41 |
| Volume Efficiency of Hydrogen Separator (area/volume) ($cm^2/cm^3$) | 7.4 | 5.1 | 4.0 |

Comparing the Examples with the Comparative Example, the results of the hydrogen separation test were scarcely different between a case where the palladium alloy films were formed on the inner surfaces of the through-holes of the porous substrate and a case where it was formed on the outer periphery of the tubular substrate.

However, the volume efficiency of the hydrogen separator could be more improved, as the porous substrate had a large number of the through-holes, and this fact indicates that the employment of the porous substrate having the through-holes is predominate.

Between a case where the mixed gas was introduced from the outside of the hydrogen separator and a case where it was introduced through the through-holes 4, any difference of the test results was not observed.

In a hydrogen separator of the present invention, a porous substrate has through-holes, and inner surfaces of the through-holes are covered with hydrogen separating films. Therefore, a volume efficiency can be noticeably improved at the separation of hydrogen, as compared with a case where the hydrogen separating films are formed on the outer peripheries of tubular porous substrates. In consequence, the weight of flanges which are used to manufacture the hydrogen separator can be reduced. If the tubular porous substrates are used and a similar volume efficiency is intended, these porous substrates must be thinned, so that their structural strength is impaired.

Furthermore, according to the present invention, the hydrogen separating films formed in the through-holes are less damaged by mechanical shock or friction, as compared with the case where the hydrogen separating films are formed on the outer peripheries of the tubular porous substrates.

When a plurality of the tubular hydrogen separators are integrated, this integration is difficult sometimes owing to the deformation of some tubes in a manufacturing step, but the employment of the hydrogen separator having a plurality of the through-holes can avoid such a problem. Moreover, when a difference of temperature distribution occurs in the hydrogen separating apparatus using the plurality of the tubular hydrogen separators, thermal expansion increases in part of the hydrogen separators owing to no transmission of heat between the hydrogen separators, and high stress is generated at the bonding position of the hydrogen separators and the flanges. However, when the hydrogen separator having the plurality of the through-holes is used, the local presence of heat can be prevented, with the result that the generation of the stress can be sufficiently inhibited.

What is claimed is:

1. A hydrogen separator comprising:

a substrate formed of a solid block of porous material having a plurality of through-holes therein, said porous material being comprised of a material selected from the group consisting of alumina, silica, silica-alumina, mullite, cordierite, zirconia, carbon, and porous glass; and a metal having a hydrogen separating ability coated on an inner surface of the through-holes of the substrate to close pores on the inner surface of the through-holes.

2. The hydrogen separator according to claim 1 wherein the metal having the hydrogen separating ability is palladium or an alloy containing palladium.

3. The hydrogen separator according to claim 1 wherein the diameter of the pores on the inner surface of the through-holes is in the range of 0.005 µm to 5 µm.

4. The hydrogen separator according to claim 1 wherein the metal having the hydrogen separating ability is palladium or an alloy containing palladium.

5. The hydrogen separator according to claim 1 wherein the diameter of the pores on the inner surface of the through-holes is in the range of 0.005 µm to 5 µm.

6. A hydrogen separating apparatus comprising:

a container having an inlet for feeding a material gas, a first outlet for discharging a hydrogen gas component, and a second outlet for discharging an unpermeated gas; and a hydrogen separator supported in an overhung state in the container, the hydrogen separator comprising a substrate formed of a solid block of porous material having a plurality of through-holes therein, said porous material being comprised of a material selected from the group consisting alumina, silica, silica-alumina, mullite, cordierite, zirconia, carbon, and porous glass, and a metal having a hydrogen separating ability coated on an inner surface of the through-holes of the substrate to close pores on the inner surface of the through-holes, wherein the hydrogen gas component in the material gas fed through the inlet is allowed to permeate through the metal having a hydrogen separating ability and then is discharged through the first outlet and the unpermeated gas is discharged through the second outlet.

7. The hydrogen separating apparatus according to claim 6 wherein the hydrogen separator has the plurality of through-holes arranged in parallel.

8. The hydrogen separating apparatus according to claim 7 wherein the container is equipped with a cushion means for absorbing the expansion of the hydrogen separator.

9. The hydrogen separating apparatus according to claim 6 wherein the container is equipped with a cushion means for absorbing the expansion of the hydrogen separator.

10. The hydrogen separating apparatus according to claim 6, wherein the metal having the hydrogen separating ability is palladium or an alloy containing palladium.

11. A method for manufacturing a hydrogen separator by a chemical plating process, said method comprising the steps of:

providing a substrate formed of a solid block of porous material having a plurality of through-holes therein, said porous material being comprised of a material selected from the group consisting of alumina, silica, silica-alumina, mullite, cordierite, zirconia, carbon, and porous glass; and forcedly circulating a plating solution containing a metal having a hydrogen separating ability through the through-holes of the substrate, whereby an inner surface of the through-holes is covered with the metal film having the hydrogen separating ability.

12. The method for manufacturing a hydrogen separator according to claim 11 wherein the plating solution containing the metal having the hydrogen separating ability is circulated through the through-holes of the substrate by the use of a pump, and the direction of the circulation is switched.

* * * * *